United States Patent [19]
Faust et al.

[11] 3,971,894
[45] July 27, 1976

[54] CABLE SPLICE CLOSURE

[75] Inventors: Carl Walter Faust, Dover; Arnold Ray Smith, Chester, both of N.J.

[73] Assignee: Bell Telephone Laboratories, Incorporated, Murray Hill, N.J.

[22] Filed: Jan. 15, 1976

[21] Appl. No.: 649,489

[52] U.S. Cl. .................................. 174/41; 174/78; 174/92
[51] Int. Cl.² ...................... H02G 7/06; H02G 15/10
[58] Field of Search .................. 174/41, 59, 60, 78, 174/88 R, 92

[56] References Cited
UNITED STATES PATENTS

| | | | |
|---|---|---|---|
| 3,153,693 | 10/1964 | Baxter et al. | 174/41 UX |
| 3,701,835 | 10/1972 | Eisele et al. | 174/41 |
| 3,808,353 | 4/1974 | Burtelson | 174/92 |
| 3,836,696 | 9/1974 | Gressitt et al. | 174/41 |
| 3,846,575 | 11/1974 | Troy | 174/41 |

*Primary Examiner*—Laramie E. Askin
*Attorney, Agent, or Firm*—J. W. Fisher

[57] ABSTRACT

Apparatus for enclosing splices between two or more multiconductor cables is disclosed. The apparatus includes a unitary support member which has affixed thereto cable ground sheath bonding circuitry, cable support apparatus, and clamps for securing the apparatus to a messenger strand. Completed splice connections are sealed in a unitary, flexible, weatherproof cover.

7 Claims, 3 Drawing Figures

CABLE SPLICE CLOSURE

BACKGROUND OF THE INVENTION

1. Field of the Invention

This invention relates to apparatus for enclosing cable splice connections and, in particular, to an overhead splice closure which is supported on a messenger cable.

2. Description of the Prior Art

Cable splice closures typified by those disclosed in U.S. Pat. Nos. 2,891,101, issued to P. P. Koliss on June 16, 1959; 3,153,693, issued to D. L. Baxter et al. on Oct. 20, 1964; 3,808,353, issued to F. W. Burtelson on Apr. 30, 1974; and 3,846,575 issued to M. K. Troy on Nov. 5, 1974 utilize numerous pieceparts to support the cables and to effect an electrical connection between a messenger cable and a ground sheath in the cables to be spliced. These pieceparts must be field assembled by a craftsperson as the splice closure is hung from the messenger cable. Since this work must be performed aerially, the proliferation of pieceparts makes it an extremely tedious operation. Consequently, the installation of splice closures of this type is time consuming and therefore expensive. Moreover, because of the number of pieceparts involved, some parts may be lost or misplaced and this further increases the amount of time required to effect a splice connection between cables. In many instances if parts are lost or misplaced the installation is left uncompleted and this gives rise to future service problems.

These types of splice closures have an additional drawback in that the amount of space available for effecting the splice connections is severely limited. Because the ground connection is fixed relative to the closure, the cables must be carefully cut so the length is just right in order for the spliced connection to fit in the enclosure. This constraint on cable length gives rise to a further problem in that cable expansion and contraction caused by temperature fluctuations may rupture the ground connection between the cable sheaths and the closure.

Accordingly, it is one object of the present invention to reduce the number of pieceparts in a cable splice closure requiring field assembly.

Another object is to configure a cable splice closure which is relatively simple to install.

A further object of the present invention is to provide a cable splice closure support structure which facilitates ease of access by a craftsperson.

Yet another object is to improve the closure seal against moisture, dust and the like.

SUMMARY OF THE INVENTION

The foregoing and other objects of the invention are realized in an illustrative embodiment of apparatus for enclosing cable splice connections between multiple conductors in at least one cable which has an electrical ground sheath and is supported by a messenger cable and corresponding multiple conductors in at least one other cable which also has an electrical ground sheath and is also supported by the messenger cable. This apparatus includes a unitary support member and means for attaching the support member to the messenger cable. The attaching means also provides an electrical connection between the support member and the messenger cable. Affixed to the support member are means for providing flexible electrical connections between the cable ground sheaths and the support member. A unitary flexible cover encloses the splice connections. This cover has first and second parallel edges which are juxtaposed to one another when an inner surface of the cover is supported atop the support member. The enclosing apparatus further includes means for securing the juxtaposed parallel edges together.

Accordingly, it is one feature of the present invention that the cable splice enclosing apparatus includes a unitary support member which is secured to the messenger cable at points just beneath it.

Another feature is that the enclosing apparatus includes a flexible ground bonding arrangement.

A further feature of the present invention is that the enclosure cover is comprised of a unitary, flexible member which is deformable to adapt to the shape of the bundle of spliced connections.

Still another feature is that the flexible cover includes an extended lip along one edge to improve its resistance to the entrance of moisture, dust and the like.

Yet a further feature of the present invention is that the number of pieceparts requiring field assembly has been reduced.

BRIEF DESCRIPTION OF THE DRAWING

The aforementioned objects and features of the invention, as well as other objects and features, will be better understood upon a consideration of the following detailed description and the appended claims taken in conjunction with the attached drawings of an illustrative embodiment in which:

Detailed Description

Figure 1:
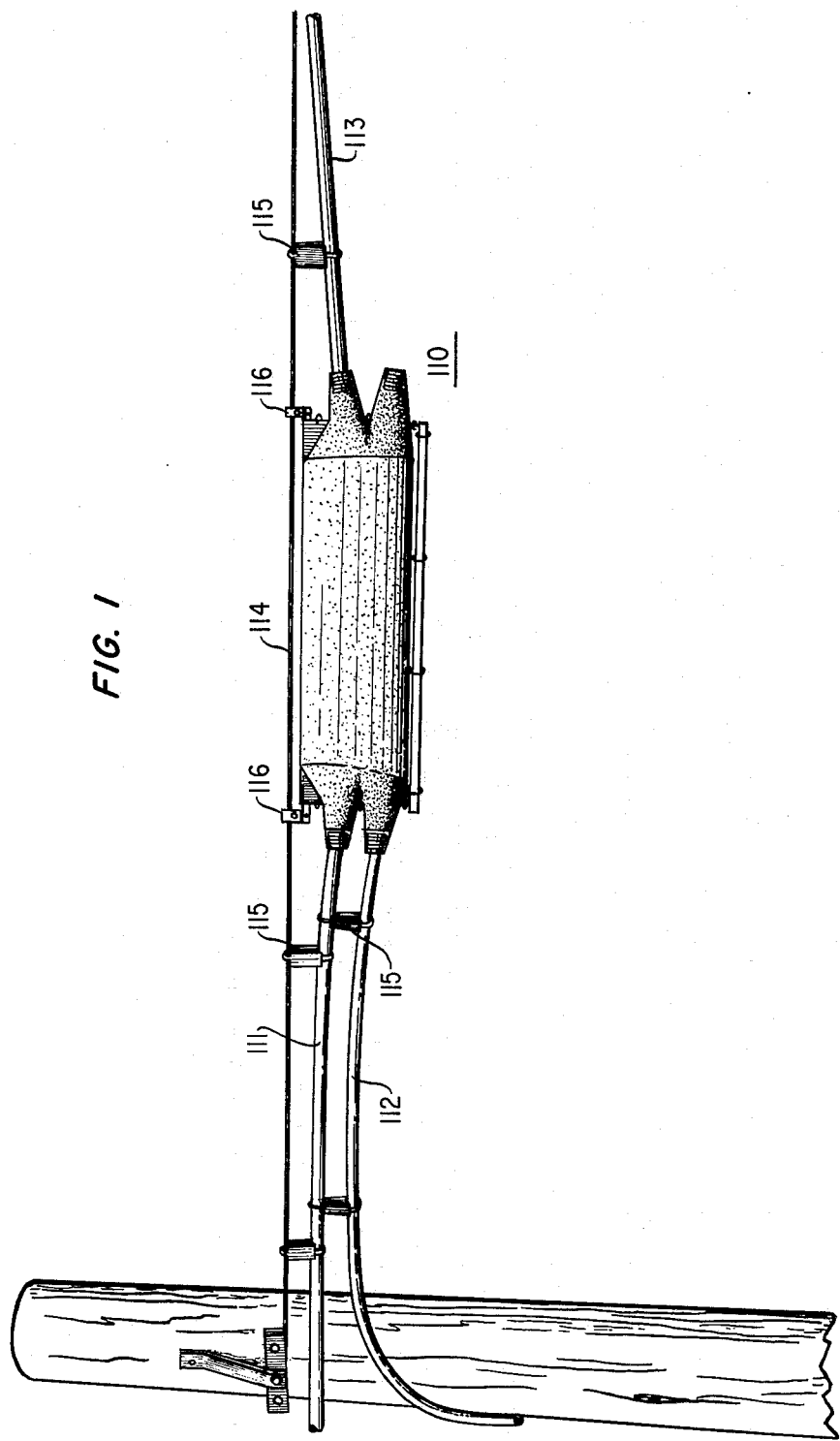
FIG. 1 illustrates an assembled cable splice enclosure supported on a messenger cable.

Illustrated in FIG. 1 is a completely assembled cable splice closure 110 used for providing a weatherproof enclosure of splice connections between multiple conductors in cables 111 and 112, for example, and corresponding multiple conductors in cable 113. Each of cables 111 and 113 is supported on a messenger cable 114 by cable clamps 115 while cable 112 is supported on cable 111 by similar clamps 115. Closure 110 is similarly supported on messenger cable 114 by strand adapters 116. Additional details illustrating the construction of strand adapter 116 may be found in our copending application designated C. W. Faust—A. R. Smith, Ser. No. 635,750, filed Nov. 11, 1975.

Figure 2:
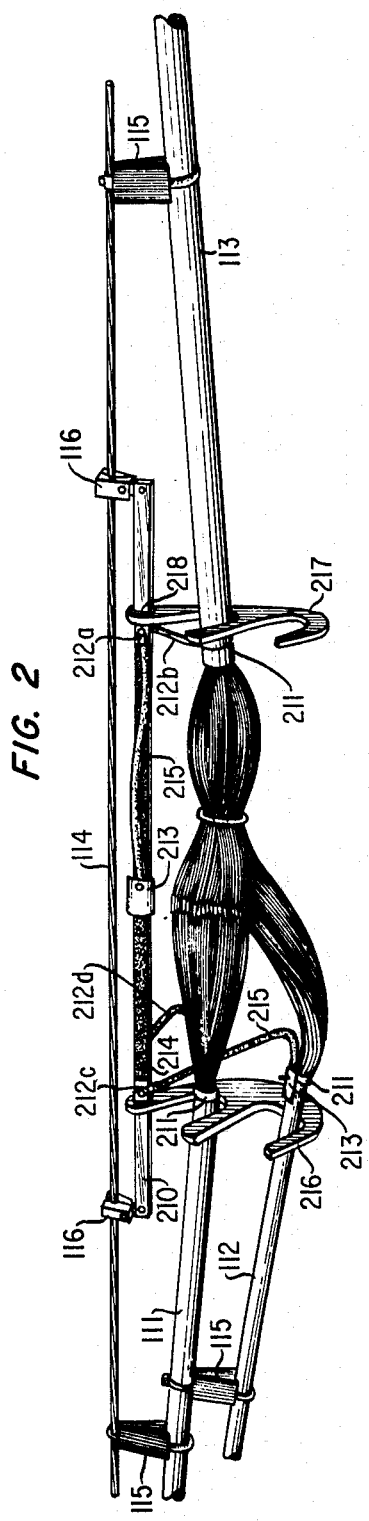
FIG. 2 illustrates the cable splice enclosure with the flexible cover removed.

Cable splice closure 110 with its cover removed is illustrated in FIG. 2. The main support for the closure 110 is provided by a unitary support member 210. It should be noted that the completed splice bundle is also lashed to the support member 210, but this is not illustrated in FIG. 2 for the sake of clarity. In addition to providing support, member 210 is partially utilized to complete an electrical ground connection between cable ground sheaths 211 in cables 111 through 113. Moreover, member 210, in conjunction with the strand adapters 116, completes an electrical ground path between messenger cable 114 and cable ground sheaths 211. In order to provide both the support function and the electrical grounding function, member 210 is comprised of a material which offers both electrical conductivity as well as structural strength. An example of a material which satisfies both of these requirements is aluminum.

As noted previously, support member 210 only partially completes the electrical ground connection between the ground sheaths 211 in cables 111 through 113. To totally complete this connection a pair of ground cables 212 are affixed to the support member 210 at intermediate points along its length. Each of the ground cables 212 is routed through an aperture in support membber 210 so that stubs of approximately equal length are available. One of these ground cable stubs 212a is shown affixed to support member 210 for later use. Ground cables 212 are securely attached to support member 210 by staking, for example, so that in addition to being secured to support member 210 they provide a relatively good electrical connection with support member 210. The ends of each of the four ground stubs are terminated with a ground sheath bonding clamp 213 of a type similar to that disclosed in U.S. Pat. No. 3,757,269, issued to R. G. Baumgartner et al. on Sept. 4, 1973.

To forestall any possibility of inadvertent short circuits, both the central portion of support member 210 and the exposed stubs of ground cables 212 are covered by insulative sleeves 214 and 215, respectively. Sleeves 214 and 215 are illustrated in FIG. 2 by a difference in shading.

Each of the cables 111 through 113 is supported in a predetermined spatial relationship within splice closure 110 by a pair of cable hangers 216 and 217. Cable hangers 216 and 217 have generally teardrop-shaped cross sections in first and second parallel planes which are perpendicular to a plane containing messenger cable 114 and support member 210. Each of the hangers 216 and 217 has a pair of slots therein which are oriented at angles of less than 90° with respect to the plane containing messenger cable 114 and support member 210. These slots have a width and depth at least equal to the diameter of the largest size cable to be accommodated in splice closure 210. Hangers 216 and 217 have apertures near the pointed end of the teardrop shape for slidably engaging support member 210. One side of hangers 216 and 217, as they are slidably placed onto support member 210, engage ground cables 212. To securely fasten hangers 216 and 217 in position adjacent to ground cables 212, a flexible O-ring 218, having an inside diameter approximately equal to the diagonal dimension of support member 210, is slid onto support member 210. It should be noted that only O-ring 218 adjacent to hanger 217 is illustrated in FIG. 2 since the one used to secure hanger 216 in place is obscured from view by the angle of the perspective used in the drawing. Cable hangers 216 and 217 are fabricated of an insulative material such as a plastic structural foam.

The slidable support offered by cable hangers 216 and 217, in conjunction with the flexible grounding arrangement provided by ground cables 212 and ground bonding clamps 213, advantageously accommodates alternate cable expansions and contractions caused by thermal fluctuations. In addition, since cable hangers 216 and 217 are placed near the ends of support member 210 and since support member 210 is secured just beneath messenger cable 114, the entire space between hangers 216 and 217 and support member 210 is available to a craftsperson for undertaking cable splicing operations. Furthermore, it should be noted that ground cables 212, hangers 216 and 217, and strand adaptors 116 are assembled onto the support member 210 during the fabrication process, thereby greatly reducing the number of pieceparts requiring field assembly.

Figure 3:
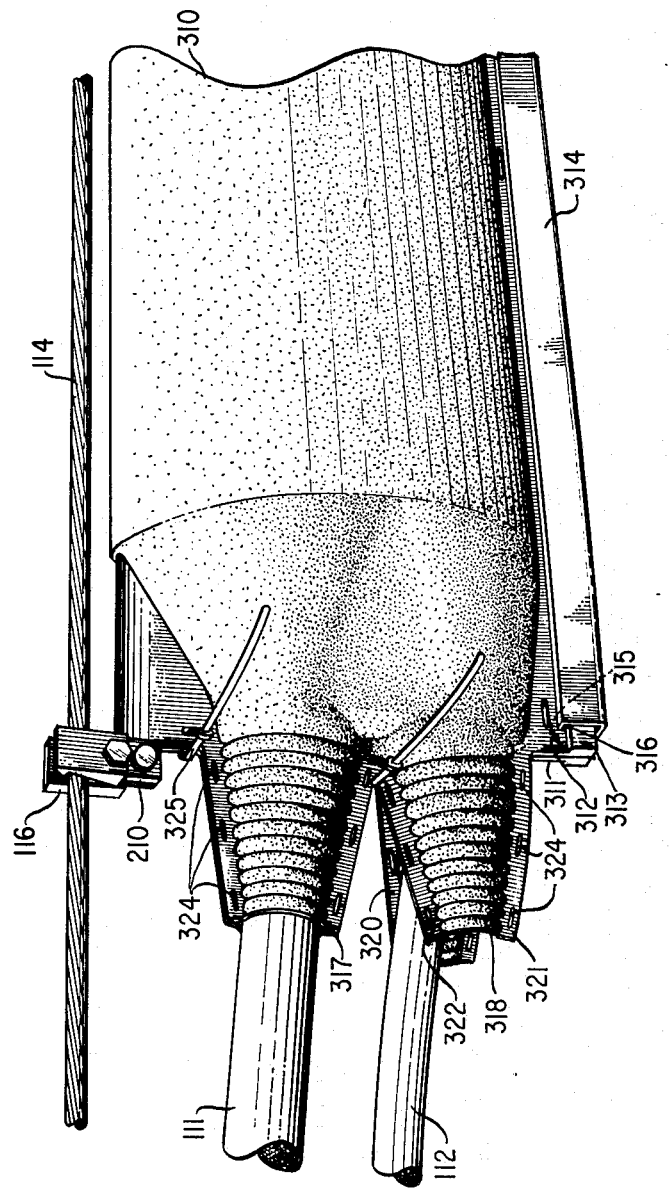
FIG. 3 illustrates the cable entrance nozzles integral with the flexible cover and the apparatus used to seal the enclosure.

After the cable splice connections are made, a unitary flexible cover 310, a portion of which is shown in FIG. 3, is used to enclose the entire assembly. Flexible cover 310 has an inner surface which is supported atop support member 210 such that parallel edges 311 and 312 are juxtaposed to one another. Extending along an edge portion of each of the parallel edges 311 and 312 is a raised bead 313. The raised bead slidably engages a generally U-shaped channel member 314 which has a pair of inwardly directed lips 315 and 316 along its edges. Lips 315 and 316, in conjunction with raised bead 313, secure parallel edges 311 and 312 to one another.

Each end of cover 310 has integral therewith a pair of cable entrance nozzles 317 and 318. Nozzles 317 and 318 have a variable diameter cross section such that a range of different cable sizes may advantageously be accommodated. In fact, depending upon the size of the cables, it is possible for two cables to enter the closure through a single nozzle. Each of nozzles 317 and 318 comprises first and second half sections 320 and 321 which are integral with the cover 310. Along an upper edge of half section 321, for example, there is an extended lip 322. Lip 322 serves both to align the two half sections 320 and 321 when they are brought together in an overlapping manner and to provide a weatherproof seal between half sections 320 and 321 when they are secured to one another.

Along the top and bottom edges of each of nozzles 317 and 318 are a series of apertures 324. These apertures receive tie wraps 325 of a type similar to those disclosed in U.S. Pat. No. 3,186,047 issued to William E. Stillwell, Jr. on June 1, 1965. Similar tie wraps are utilized along the parallel edges 311 and 312 of cover 310 to provide additional sealing and to secure channel member 314 in place after it has been placed over raised bead 313.

In all cases it is to be understood that the above-described embodiment is illustrative of but a small number of many possible specific embodiments which can represent applications of the principles of the invention. Thus, numerous and various other embodiments can readily be devised in accordance with these principles by those skilled in the art without departing from the spirit and scope of the invention.

What is claimed is:

1. Apparatus for enclosing cable splice connections between multiple conductors in at least one cable having an electrical ground sheath and supported by a messenger cable and corresponding mulitple conductors in at least one other cable having an electrical ground sheath and supported by said messenger cable, said apparatus including
    a unitary support member,
    means for attaching said support member to said messenger cable, said attaching means also for providing an electrical connection between said support member and said messenger cable,
    means, affixed to said support member, for providing a flexible electrical connection between said ground sheaths in said one and said other cable and said support member, unitary flexible means for enclosing said splice connections, said flexible means having an inner surface and first and second parallel edges, a portion of said inner surface supported atop said support member such that said first and second parallel edges are juxtaposed to one another, and means for securing said juxtaposed first and second parallel edges to one another.

2. Apparatus in accordance with claim 1 further including means, affixed to said support member, for holding said one cable and said other cable in a predetermined spatial relationship with respect to one another.

3. Apparatus in accordance with claim 2 wherein said holding means includes first and second members having generally teardrop-shaped cross sections in first and second parallel planes which are perpendicular to a plane containing said support member and axes of symmetry of said first and second members, each of said members having first and second slots oriented at angles of less than ninety degrees with respect to said plane perpendicular with said first and second parallel planes, said slots having a width and a depth at least equal to a diameter of said cables to be held, means, integral with each of said first and second members, for slidably engaging said support member, and means for securing said first and second members on said support member at a specified location.

4. Apparatus in accordance with claim 1 wherein said unitary support member includes an electrically conductive rod, and an insulative sleeve covering a central portion of said rod.

5. Apparatus in accordance with claim 1 wherein said means for providing a flexible electrical connection between said ground sheaths and said support member includes, first and second ground cables routed through first and second spaced-apart apertures in said support member, said ground cables being secured in place in said apertures by a staked connection, a plurality of ground sheath bonding clamps, one such clamp affixed to each end of said first and second ground cables, and a plurality of insulative sleeves, one such sleeve affixed about each ground cable segment between said bonding clamp and said staked connection.

6. Apparatus in accordance with claim 1 wherein said unitary flexible enclosing means includes at least one nozzle on a first side edge of said enclosing means and at least one other nozzle on a second side edge of said enclosing means, each of said nozzles comprised of first and second half sections which are integral with said enclosing means, said first half section having integral therewith along a top edge an extended lip for aligning a top edge of said second half section and for providing an overlapping weatherproof seal between said half sections when they are secured to one another, each of said nozzles further having a variable diameter cross section for accommodating a specified range of cable sizes, and means for securing said top edges and edges opposite thereto together to provide a weatherproof seal at said nozzles.

7. Apparatus in accordance with claim 1 wherein said securing means includes first and second raised beads extending along a length of said juxtaposed first and second parallel edges, respectively, and a generally U-shaped channel member having inwardly directed lips along top edges, said channel member being slidably engageable with said first and second raised beads to secure said juxtaposed first and second parallel edges together.

* * * * *